(12) United States Patent
Kremp et al.

(10) Patent No.: US 11,079,536 B2
(45) Date of Patent: Aug. 3, 2021

(54) SUPPRESSING SURFACE MODES IN FIBERS

(71) Applicant: OFS FITEL, LLC, Norcross, GA (US)

(72) Inventors: Tristan Kremp, Somerset, NJ (US); Brian Mangan, Hopewell, NJ (US); Robert S. Windeler, Annandale, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 16/858,355

(22) Filed: Apr. 24, 2020

(65) Prior Publication Data

US 2020/0257042 A1    Aug. 13, 2020

Related U.S. Application Data

(63) Continuation of application No. 16/155,310, filed on Oct. 9, 2018, now Pat. No. 10,698,154.

(60) Provisional application No. 62/570,804, filed on Oct. 11, 2017.

(51) Int. Cl.
*G02B 6/02* (2006.01)
*C03B 37/012* (2006.01)
*C03B 37/027* (2006.01)

(52) U.S. Cl.
CPC ...... *G02B 6/02328* (2013.01); *C03B 37/0122* (2013.01); *C03B 37/01208* (2013.01); *C03B 37/02781* (2013.01); *G02B 6/0239* (2013.01); *G02B 6/02338* (2013.01); *G02B 6/02357* (2013.01); *C03B 2203/16* (2013.01)

(58) Field of Classification Search
None
See application file for complete search history.

(56) References Cited

U.S. PATENT DOCUMENTS 9,158,065 B2 * 10/2015 Fini ..................... G02B 6/02328

* cited by examiner

*Primary Examiner* — Michelle R Connelly
(74) *Attorney, Agent, or Firm* — Sam S. Han, Esq.

(57) ABSTRACT

A hollow core fiber (HCF) has a cross section with a substantially-circular hollow core in a cladding lattice, an axial center and a reference direction that extends radially in one direction from the axial center. The HCF comprises modified holes that are located along linear paths that extend radially outward from the axial center. The modified holes, which are located at various radial distances from the axial center and at various azimuthal angles from the reference direction, have non-uniform modified properties. These non-uniform modified properties include radially-varying properties, azimuthally-varying properties, or a combination of radially-varying and azimuthally-varying properties.

17 Claims, 12 Drawing Sheets

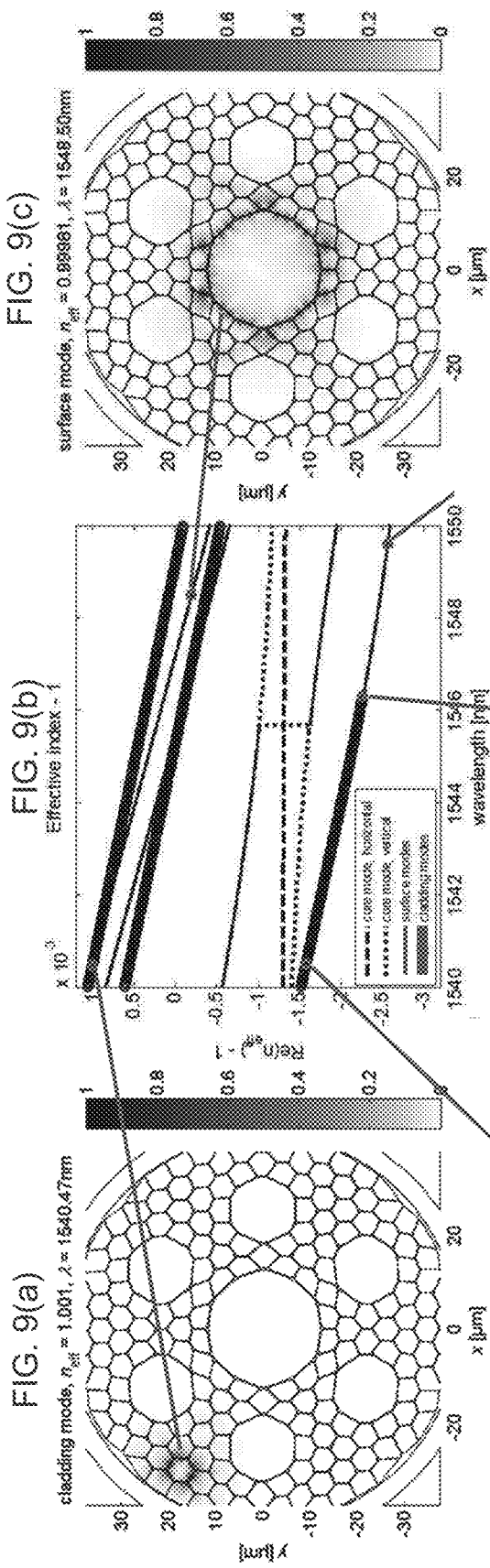

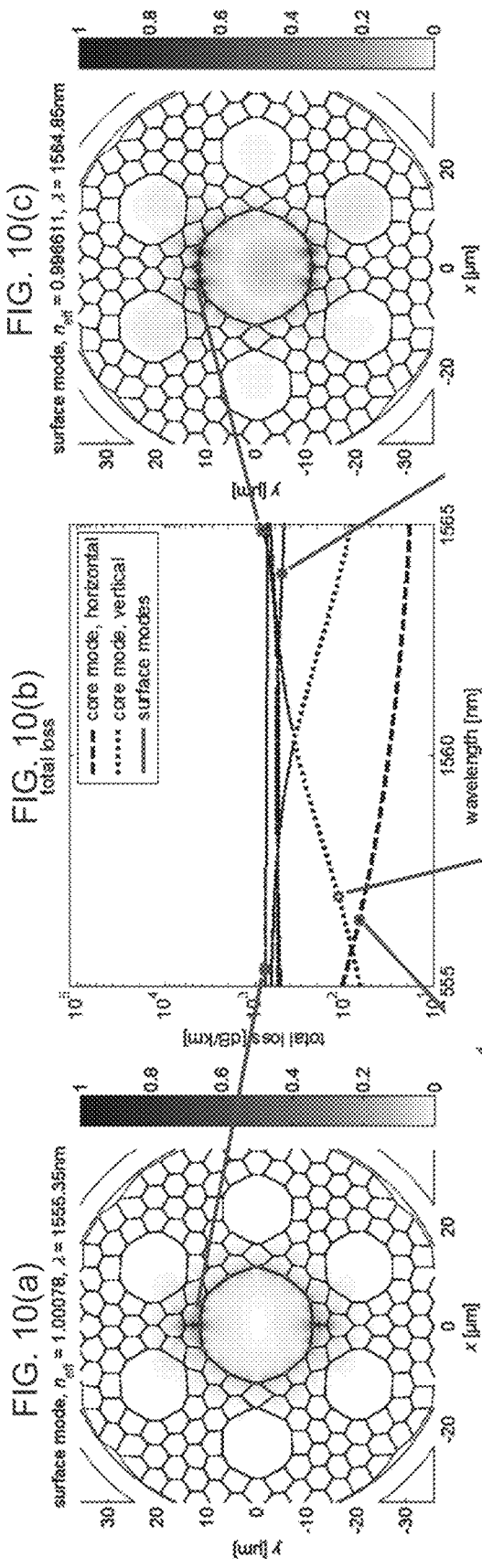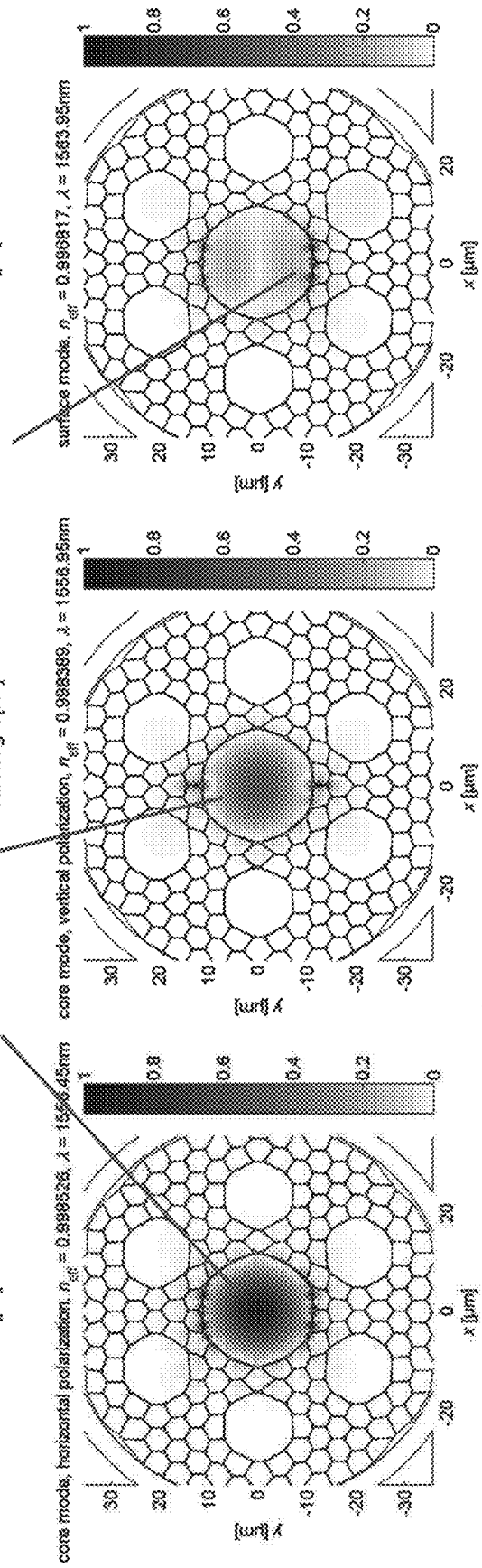

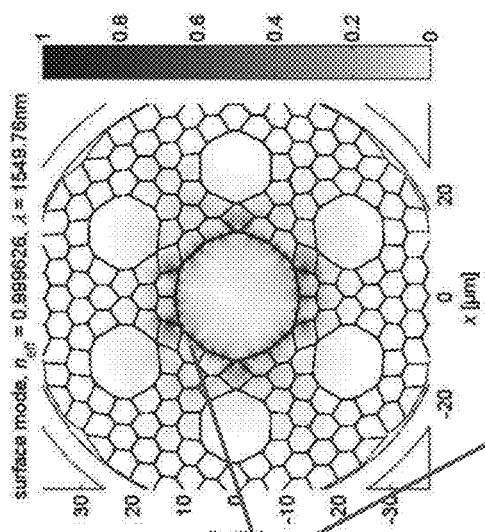
FIG. 12(c)
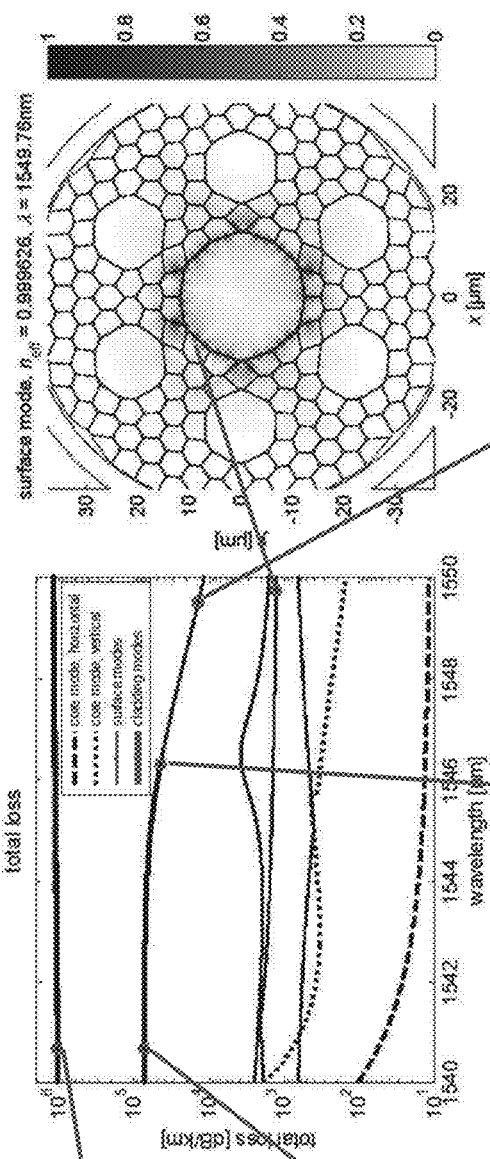
FIG. 12(b)
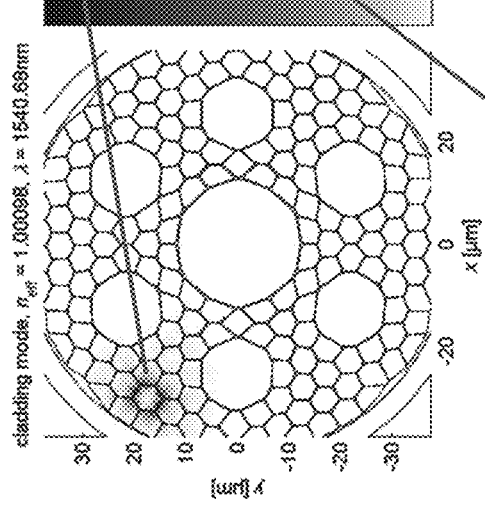
FIG. 12(a)
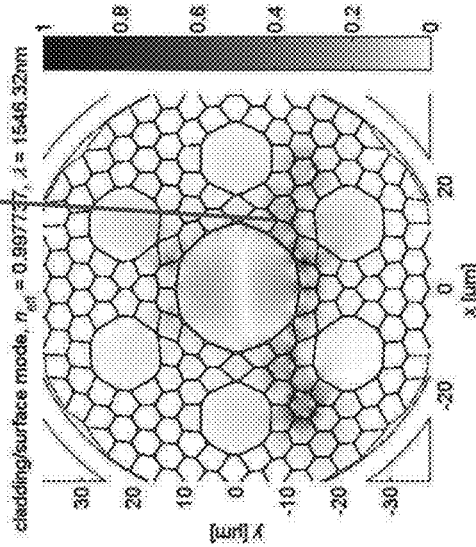
FIG. 12(f)
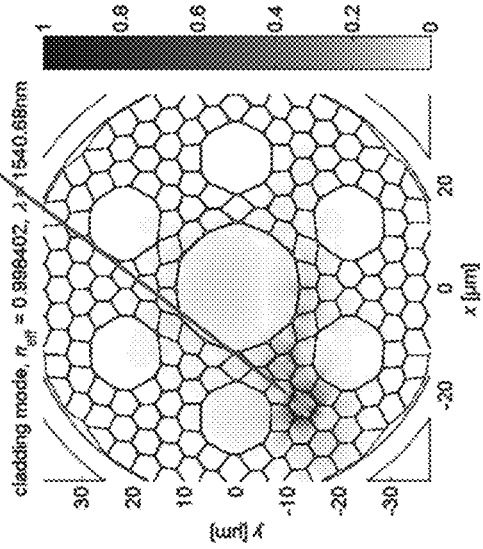
FIG. 12(e)
FIG. 12(d)

SUPPRESSING SURFACE MODES IN FIBERS

CROSS REFERENCE TO RELATED APPLICATIONS

This application is a continuation of prior application Ser. No. 16/155,310, filed on 2018 Oct. 9, by Kremp, et al., and having the title "Suppressing Surface Modes In Fibers," which claimed the benefit of U.S. provisional patent application Ser. No. 62/570,804, filed 2017 Oct. 11, having the title "Surface Mode Suppression in Hollow Core Fibers," by Kremp, both of which are incorporated herein by reference as if expressly set forth in their entireties.

BACKGROUND

Field of the Disclosure

The present disclosure relates generally to optical fibers and, more particularly, to propagation of signals in optical fibers.

Description of Related Art

A conventional hollow core fiber (HCF) 110 (as shown in FIG. 1) typically comprises a central core 150 in a matrix 140 (also designated as microstructured cladding 140) that has holes 120 separated by struts 130 (also designated as walls 130). Some previously known HCF 110 comprise one or more outer cores (also referred to as shunt cores or shunts) 160a, 160b (collectively 160), which are usually also located in the microstructured cladding 140, to suppress unwanted higher order modes (HOM). A conventional HCF 110, regardless of whether it has outer cores or not, sometimes experiences multipath interference due to an insufficient suppression of unwanted surface modes, which consequently impairs one or more output signals of the HCF 110.

SUMMARY

The present disclosure provides systems and processes for manufacturing hollow core fibers (HCF). The disclosed HCF comprises a cross section with a substantially-circular hollow core in a cladding lattice, an axial center and a reference direction that extends radially in one direction from the axial center. The HCF comprises modified holes that are located along linear paths that extend radially outward from the axial center. The modified holes, which are located at various radial distances from the axial center and at various azimuthal angles from the reference direction, have non-uniform modified properties, such as, for example, radially-varying properties, azimuthally-varying properties, or a combination of radially-varying and azimuthally-varying properties.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 7(*b*) is a graph showing an effective index as a function of wavelength for various mode shapes in HCF0.

FIG. 7(*c*) is another mode shape map showing an unwanted core surface mode ("surface mode") in HCF0.

FIG. 7(*d*) is a mode shape map showing a vertically-polarized fundamental core mode in HCF0.

FIG. 7(*e*) is a mode shape map showing another unwanted surface mode in HCF0.

FIG. 7(*f*) is a mode shape map showing another unwanted surface mode in HCF0.

FIG. 8(*b*) is a graph showing an effective index as a function of wavelength for various mode shapes in HCF1.

FIG. 8(*c*) is a mode shape map showing a cladding mode between several modified holes in HCF1.

FIG. 8(*d*) is a mode shape map showing another unwanted surface mode in HCF1.

FIG. 8(*e*) is a mode shape map showing an unwanted surface mode that is coupled to a cladding mode in HCF1.

FIG. 8(*f*) is a mode shape map showing another cladding mode between several modified holes in HCF1.

FIG. 9(*a*) is a mode shape map showing a cladding mode in an individual modified hole in another example of an HCF with modified holes in the microstructured cladding (designated herein as HCF2 for convenience).

FIG. 9(*b*) is a graph showing an effective index as a function of wavelength for various mode shapes in HCF2.

FIG. 9(*c*) is another mode shape map showing an unwanted surface mode in HCF2.

FIG. 9(*d*) is a mode shape map showing a cladding mode in another modified hole in HCF2.

FIG. 9(*e*) is a mode shape map showing an unwanted surface mode that is coupled to a cladding mode in HCF2.

FIG. 9(*f*) is a mode shape map showing another unwanted surface mode in HCF2.

FIG. 10(*a*) is a mode shape map showing an unwanted surface mode in HCF0.

FIG. 10(*b*) is a graph showing total loss as a function of wavelength for various mode shapes in HCF0.

FIG. 10(c) is another mode shape map showing another unwanted surface mode in HCF2.

FIG. 10(d) is a mode shape map showing a horizontally-polarized fundamental mode in HCF0.

FIG. 10(e) is yet another mode shape map showing a vertically-polarized fundamental mode in HCF0.

FIG. 10(f) is another mode shape map showing another unwanted surface mode in HCF0.

FIG. 12(a) is a mode shape map showing a cladding mode in an individual modified hole in HCF2.

FIG. 12(b) is a graph showing total loss as a function of wavelength for various mode shapes in HCF2.

FIG. 12(c) is another mode shape map showing an unwanted surface mode in HCF2.

FIG. 12(d) is a mode shape map showing a cladding mode in another modified hole in HCF2.

FIG. 12(e) is a mode shape map showing an unwanted surface mode that is coupled to a cladding mode in HCF2.

FIG. 12(f) is a mode shape map showing another unwanted surface mode in HCF2.

DETAILED DESCRIPTION OF THE EMBODIMENTS

Figure 1:
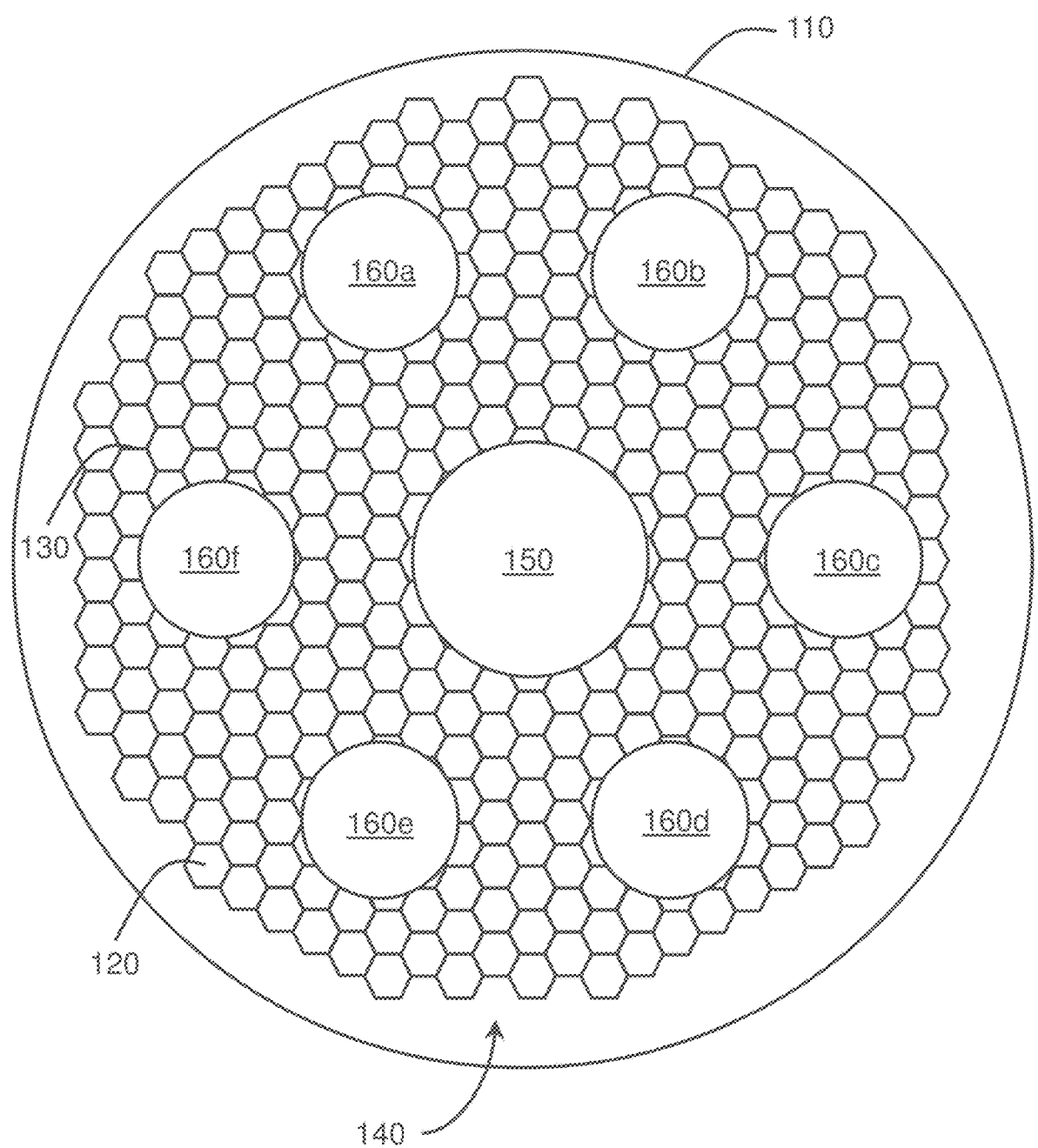
FIG. 1 is a diagram showing a cross section of a conventional hollow core fiber (HCF).

Hollow core fibers (HCF) are manufactured with a cladding matrix that includes a hollow central core. Because of such a structure, HCF often support core modes (which are confined to the hollow core) as well as modes that are confined to the interface between the hollow core and the cladding matrix (which are designated as "core surface modes" or just "surface modes" for notational convenience). These surface modes are often undesirable because they sometimes introduce noise, change dispersion properties, and lead to multipath interference. Thus, surface modes often impair output signal.

To maintain signal integrity, these unwanted surface modes are usually suppressed or stripped away. In previous efforts at suppressing surface modes, radially periodic resonant features (such as a substantially-uniform row of partially-collapsed holes) were introduced into a cladding matrix of the HCF. These types of resonant features introduce anisotropy in the cladding, thereby suppressing certain surface modes. However, such an approach also impacts the fundamental mode signal to a certain degree. Furthermore, the prior efforts to partially collapse holes employed different pressures to realize the partial-collapsed holes. Unfortunately, the use of pressure alone to change the microstructure is limited because different structures can only be accomplished with different pressures during the fiber draw process. Such an application of different pressures (concurrently to create different microstructures) is not scalable and, in practice, nearly impossible when complex microstructures are needed.

To concurrently suppress surface modes and reduce the impact on the fundamental mode, the present disclosure teaches and enables an HCF with modified holes in the cladding matrix. The modified holes are located along linear paths that extend radially outward from the axial center, meaning that more than a single radial line is modified. The modified holes, which are located at various radial distances from the axial center and at various azimuthal angles from the reference direction, have non-uniform modified properties (e.g., radially-varying properties, azimuthally-varying properties, or a combination of radially-varying and azimuthally-varying properties). The modified properties can be radially periodic or non-periodic. Furthermore, a modification of the holes can be achieved by replacing a regular cladding hole by a different number of modified holes, e.g., replacing one regular cladding hole by several smaller modified holes, or replacing several regular cladding holes by one large modified hole, or, more generally, by replacing a number of regular cladding holes by a larger number of modified holes, or by a smaller number of modified holes. The replacement can also contain solid rods or a shape that is different from the original lattice, e.g., inserting a square or a polygon in a hexagonal lattice. The combination of non-uniform properties along multiple radially-extending paths results in both the suppression of unwanted surface modes and a reduced impact on the fundamental mode signal. This is achieved by effectively creating a lossy waveguide for cladding modes of which some have approximately the same effective index as one or more unwanted surface modes.

Having provided a general solution, reference is now made in detail to the description of the embodiments as illustrated in FIG. 2 through FIG. 12(f). Specifically, FIGS. 2 through 6 show axial cross sections of various embodiments of hollow core fibers (HCF), while FIGS. 7(a) through 12(f) show graphs that explain the properties of various HCF embodiments. Because the cores of the fiber are substantially circular, a convenient reference point for describing HCF geometries is by reference to the center (also designated herein as an axial center). Furthermore, although any direction extending from the axial center can be chosen as a reference direction for describing azimuthal angles, for convenience the twelve o'clock position (extending from the axial center) is chosen as the reference direction for the straight fiber. In other words, azimuthal angles are described with reference to the 12 o'clock position for each of the axial cross sections in FIGS. 2 through 6. While angles are measured in the mathematically positive counter-clockwise direction, we here measure them in the clockwise direction for simplicity. Hence, 0° refers to the 12 o'clock position, 60° to the 2 o'clock position, 120° to the 4 o'clock position, 180° to the 6 o'clock position, 240° to the 8 o'clock position, and 300° to the 10 o'clock position. While several embodiments are described in connection with these drawings, there is no intent to limit the disclosure to the embodiment or embodiments disclosed herein. On the contrary, the intent is to cover all alternatives, modifications, and equivalents.

Figure 2:
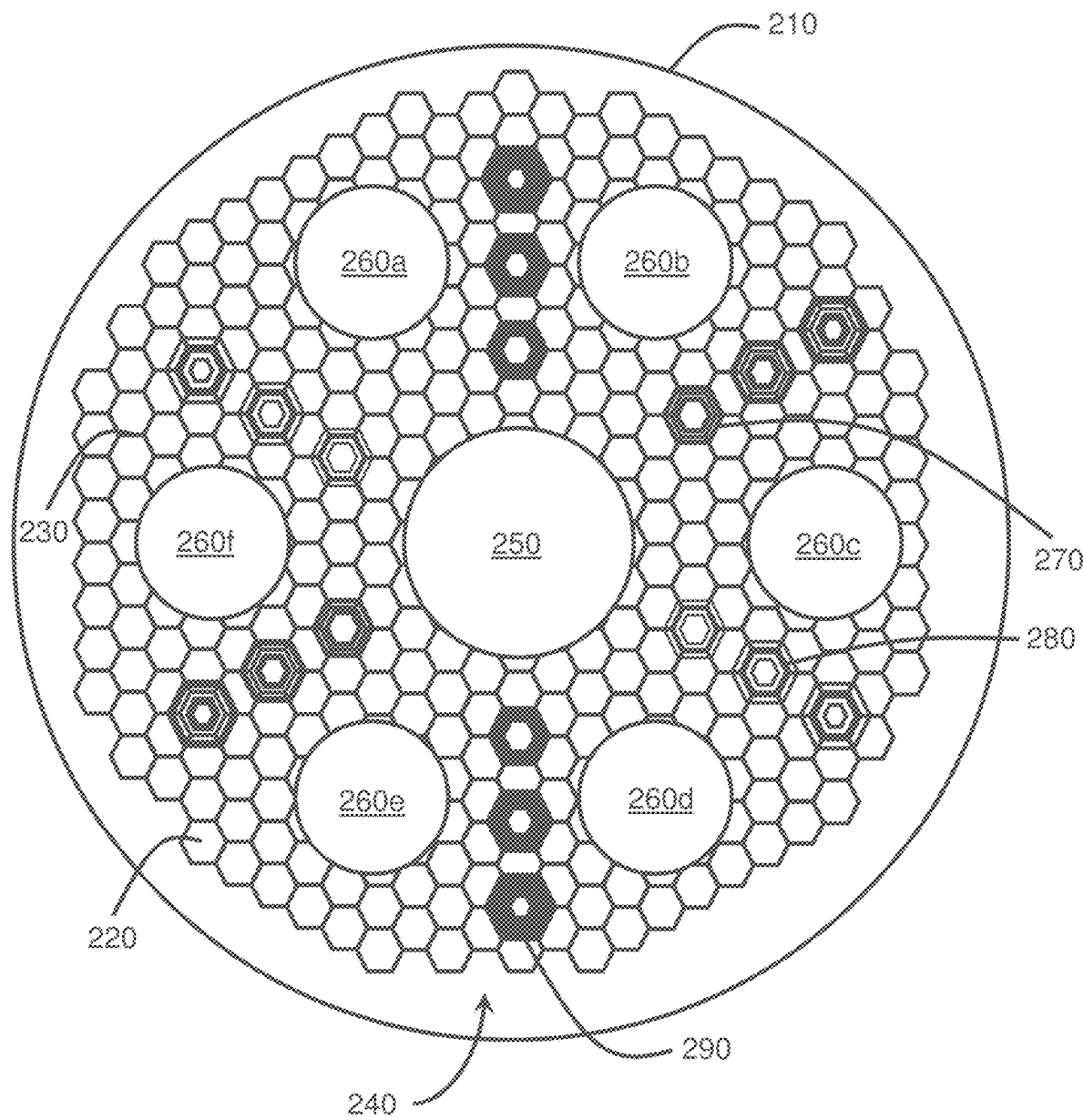
FIG. 2 is a diagram showing a cross section of one embodiment of an HCF having modified holes that vary both radially and azimuthally.

With this in mind, FIG. 2 is a diagram showing an axial cross section of an optical fiber 210 having cladding holes 220 and struts 230, which form a cladding matrix 240. The points where the struts 230 intersect are known as nodes. The struts 230, which have substantially-uniform properties, are located between adjacent cladding holes 220. Usually, the cladding holes 220 also have substantially-uniform properties, but this invention can also be applied to HCF with microstructured claddings that have nonuniform properties.

The optical fiber 210 comprises a hollow core 250 that is located substantially at the axial center and, thus, the cladding matrix 240 surrounds the hollow core 250. In addition to the hollow core 250, the embodiment of FIG. 2 also comprises shunt cores 260a, 260b, 260c, 260d, 260e, 260f (collectively, 260) that are disposed in the cladding matrix 240. As shown in FIG. 2, each shunt core 260 is located at its respective radial distance from the axial center and, also, at its respective azimuthal angle from the reference direction (e.g., at approximately 30°, 90°, 150°, 210°, 270°, and 330° from the reference direction). It should be appreciated that the shunt cores 260 attenuate unwanted higher-order modes (HOMs) and, for some embodiments, are optional features.

The optical fiber 210 further comprises modified holes 270, 280, 290, which are disposed in the cladding matrix 240 at various radial distances from the axial center and, also, at various azimuthal angles from the reference direction. For purposes of this disclosure, the phrase "modified holes" includes holes with an inner diameter of zero (0) and a finite outer diameter. Continuing, the modified holes 270, 280, 290 are located along linear paths that extend radially outward from the axial center. For example, in the embodiment of FIG. 2, those linear paths are located at approximately 0°, 60°, 120°, 180°, 240°, and 300° from the reference direction, meaning that the modified holes 270, 280, 290 are positioned in the cladding matrix 240 between adjacent shunt cores 260. Unlike the shunt cores 260 (which attenuate the unwanted HOMs), the modified holes 270, 280, 290 attenuate unwanted surface modes. Thus, because HOMs are different from surface modes, the principles of operation that govern the shunt cores 260 are different from the principles of operation that govern the modified holes 270, 280, 290.

In addition to following a radially-extending linear path, the modified holes 270, 280, 290 have non-uniform properties (also designated as modified properties) that are different from the substantially-uniform cladding-hole properties. For example, the modified properties include hole diameters, hole shapes (more round or less round, with more or less convex or concave surfaces, etc.), wall thicknesses, materials, dopant types, dopant concentrations, roughness of hole surfaces, different loss characteristics, or a combination of these and other properties. Specifically, FIG. 2 shows the modified holes 270, 280, 290 as having both azimuthally-varying properties (as illustrated with different line types) and radially-varying properties (as illustrated with different line thicknesses). As indicated in FIG. 2, the modified holes 270 at 60° and 240° can have different properties when compared to the modified holes 290 at 0° and 180°. Moreover, even within the same linear path (see, e.g., modified holes 270 at 60°), the more-radially-central modified holes can have different properties when compared to the more-radially-peripheral modified holes.

As one can appreciate, suitable modifications (both radially and azimuthally) allow for finer control of optical properties, thereby improving both surface mode suppression and fundamental mode integrity. Moreover, greater surface mode loss is achievable by introducing multiple radial paths in which modified holes 270, 280, 290 reside.

Before turning to FIGS. 3 through 12(f), it should be appreciated that the hollow core optical fiber 210 is manufactured, in some embodiments, using a stack-and-draw process in which different capillary tubes are arranged in a glass outer tube to form a preform, which is subsequently drawn into a fiber. As such, the manufacturing process comprises arranging capillary tubes in the outer tube to form a matrix having a hollow region at the axial center (which eventually becomes the hollow core). The manufacturing process further comprises positioning modified tubes among the capillary tubes along a linear path. By positioning different modified tubes (e.g., tubes with different outer or inner diameters, tubes of different shapes (more round or less round, with more or less convex or concave surfaces, with or without nested shapes inside), tubes with different wall thicknesses, tubes with different materials, dopant types, dopant concentrations, tubes with different surface roughness, tubes with different losses, tubes with different optical properties, etc.) at various radial distances and various azimuthal angles, a hollow core fiber (HCF) can be manufactured with radially-varying properties, azimuthally-varying properties, or a combination of radially-varying and azimuthally-varying properties. For purposes of this disclosure, the phrase "modified tubes" is defined expressly to include modified rods (having an inner diameter of zero (0) and a finite outer diameter).

Figure 3:
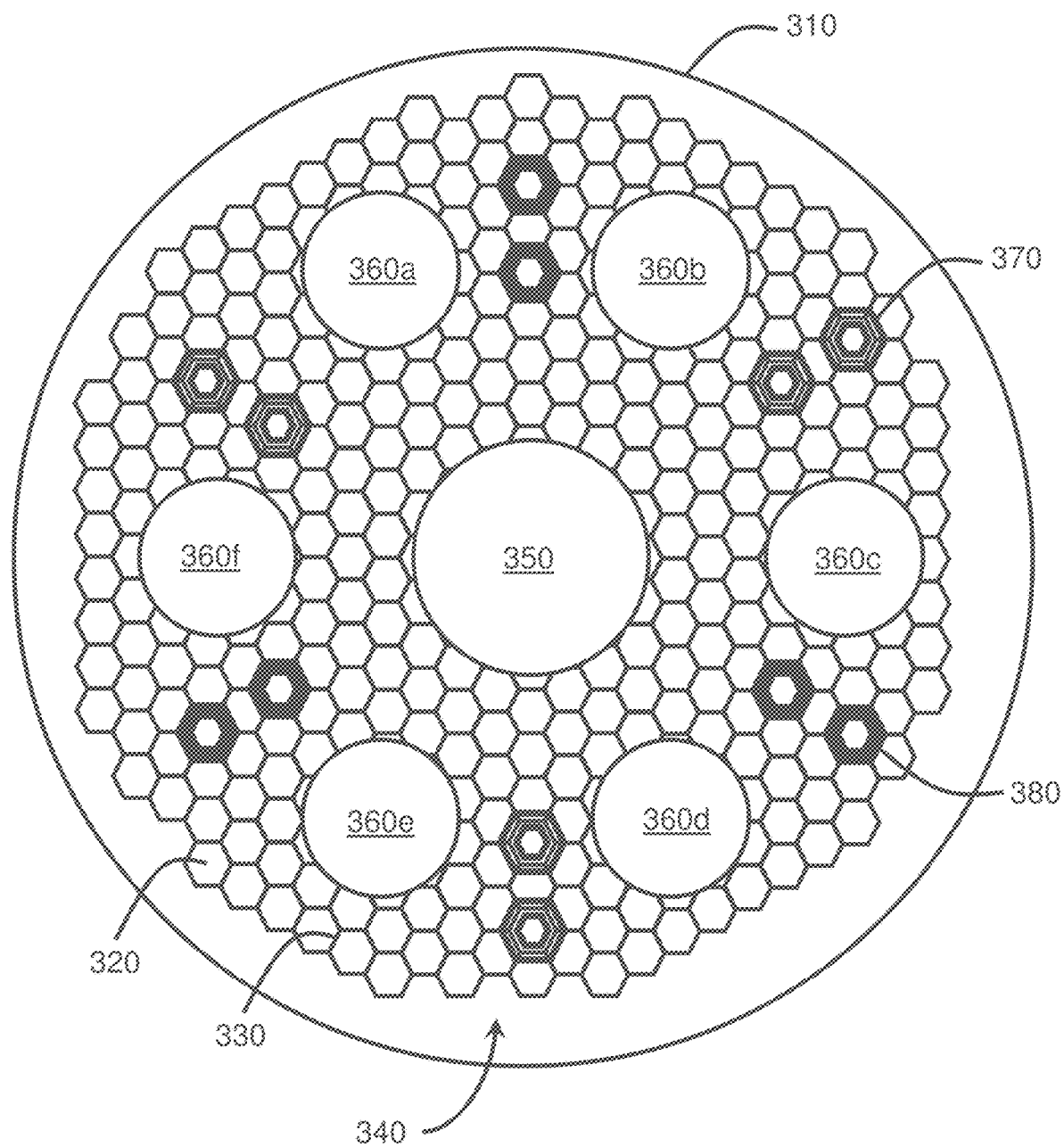
FIG. 3 is a diagram showing a cross section of one embodiment of an HCF having modified holes that vary azimuthally.

Next, unlike FIG. 2 (which shows both radially-varying properties combined with azimuthally-varying properties), the embodiment of FIG. 3 shows only azimuthally-varying modified holes 370, 380. Additionally, unlike FIG. 2 (which shows three (3) holes along the linear path being modified), FIG. 3 shows only two (2) holes along the linear path being modified. Thus, although both FIGS. 2 and 3 show radial leakage paths (namely, the linear radial paths), the properties of the leakage path in FIG. 3 differ from the properties of the leakage path in FIG. 2.

Stated differently, although FIG. 3 is similar to FIG. 2 in that the optical fiber 310 comprises similarly-structured cladding holes 320, struts 330, a cladding matrix 340, a central hollow core 350, and shunt cores 360a, 360b, 360c, 360d, 360e, 360f (collectively, 360), the optical fiber 310 of FIG. 3 differs from the embodiment of FIG. 2 insofar as there are fewer modified holes 370, 380 and the modified holes 370, 380 vary azimuthally but not radially. Thus, for example, the modified holes 370 at 60° have substantially the same shape, wall thicknesses, hole diameters, materials, dopant types, dopant concentrations, surface roughness loss, etc. However, the wall thickness, hole diameter, material, surface roughness at 60° is different from those found in the modified holes 380 at 120°.

Figure 4:
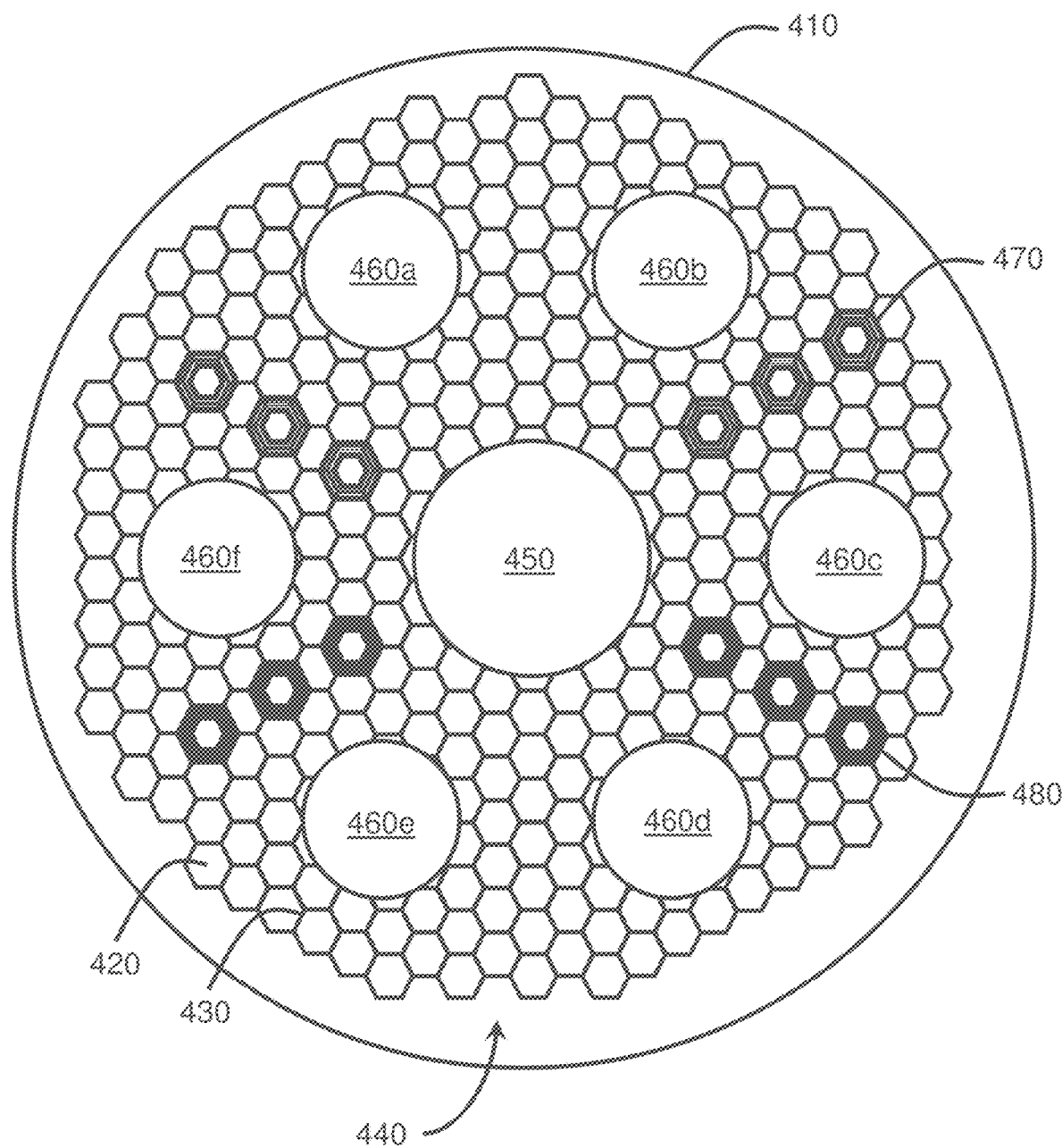
FIG. 4 is a diagram showing a cross section of another embodiment of an HCF having modified holes that vary azimuthally.

FIG. 4 shows a cross section of another embodiment of an optical fiber 410 with modified holes that vary azimuthally. Insofar as cladding holes 420, struts 430, cladding matrix 440, hollow core 450, and shunt cores 460a, 460b, 460c, 460d, 460e, 460f (collectively 460) have been discussed with reference to FIG. 3, further discussion of these structural features is omitted with reference to FIG. 4. However, unlike FIG. 3 (which showed six (6) sets of modified holes, namely, at 0°, 60°, 120°, 180°, 240°, and 300°), the embodiment of FIG. 4 includes only four (4) sets of modified holes 470, 480, namely, at 60°, 240°, 120°, and 300°. Similar to FIG. 3, the modified holes 470, 480 in the optical fiber 410 of FIG. 4 vary azimuthally but not radially. Insofar as this type of variation is also discussed in detail with reference to FIG. 3, only a truncated discussion is provided with reference to FIG. 4.

Figure 5:
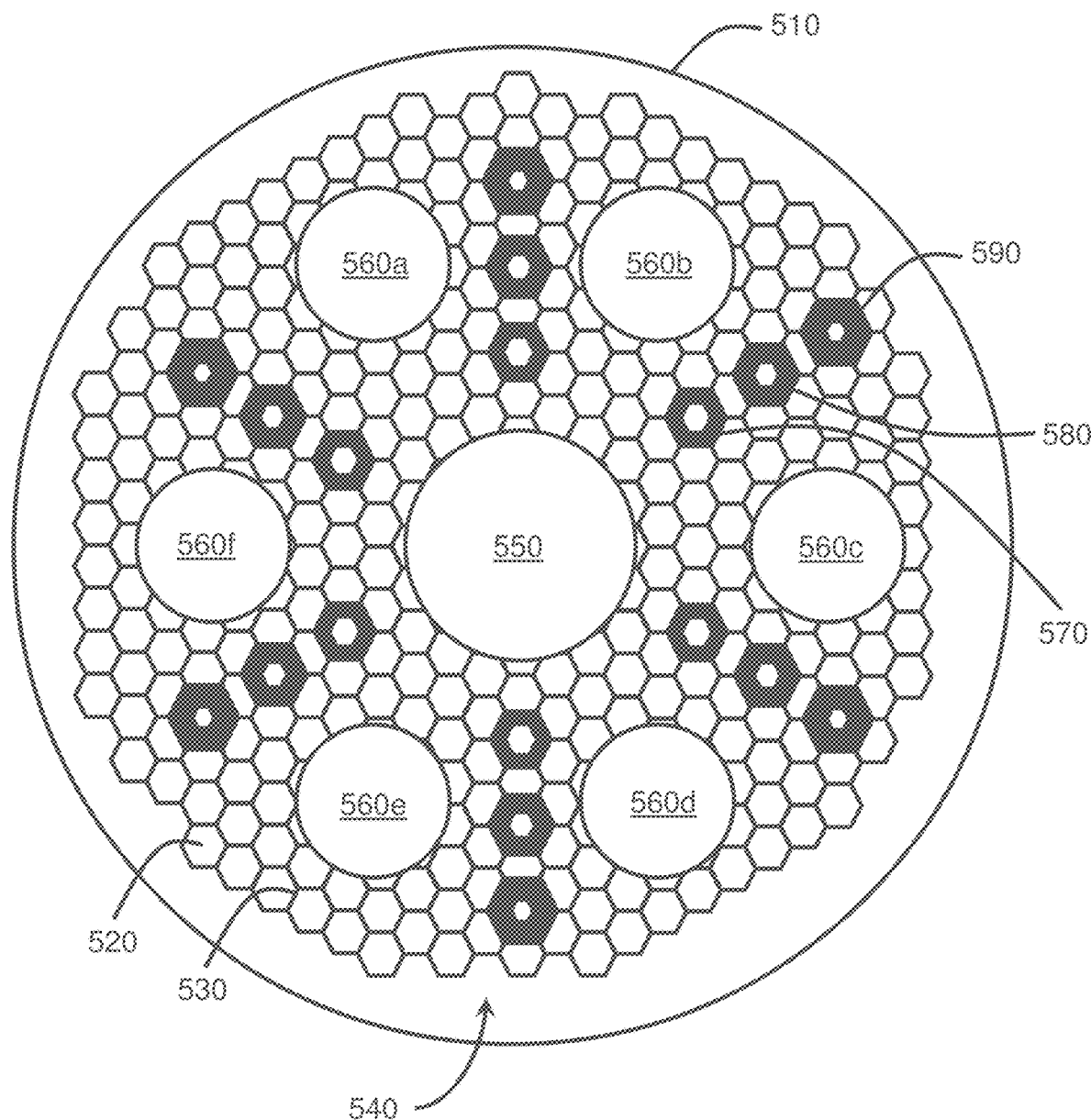
FIG. 5 is a diagram showing a cross section of another embodiment of an HCF having modified holes that vary radially.

Turning now to FIG. 5, this embodiment of the optical fiber 510 comprises modified holes 570, 580, 590, which vary radially, but not azimuthally. Insofar as radial variations are discussed with reference to FIG. 2, only a truncated discussion is provided with reference to FIG. 5. Also, to the extent that cladding holes 520, struts 530, a cladding matrix 540, a hollow core 550, and shunt cores 560a, 560b, 560c, 560d, 560e, 560f (collectively 560) are discussed above, further discussion of these structural features is omitted with reference to FIG. 5.

Figure 6:
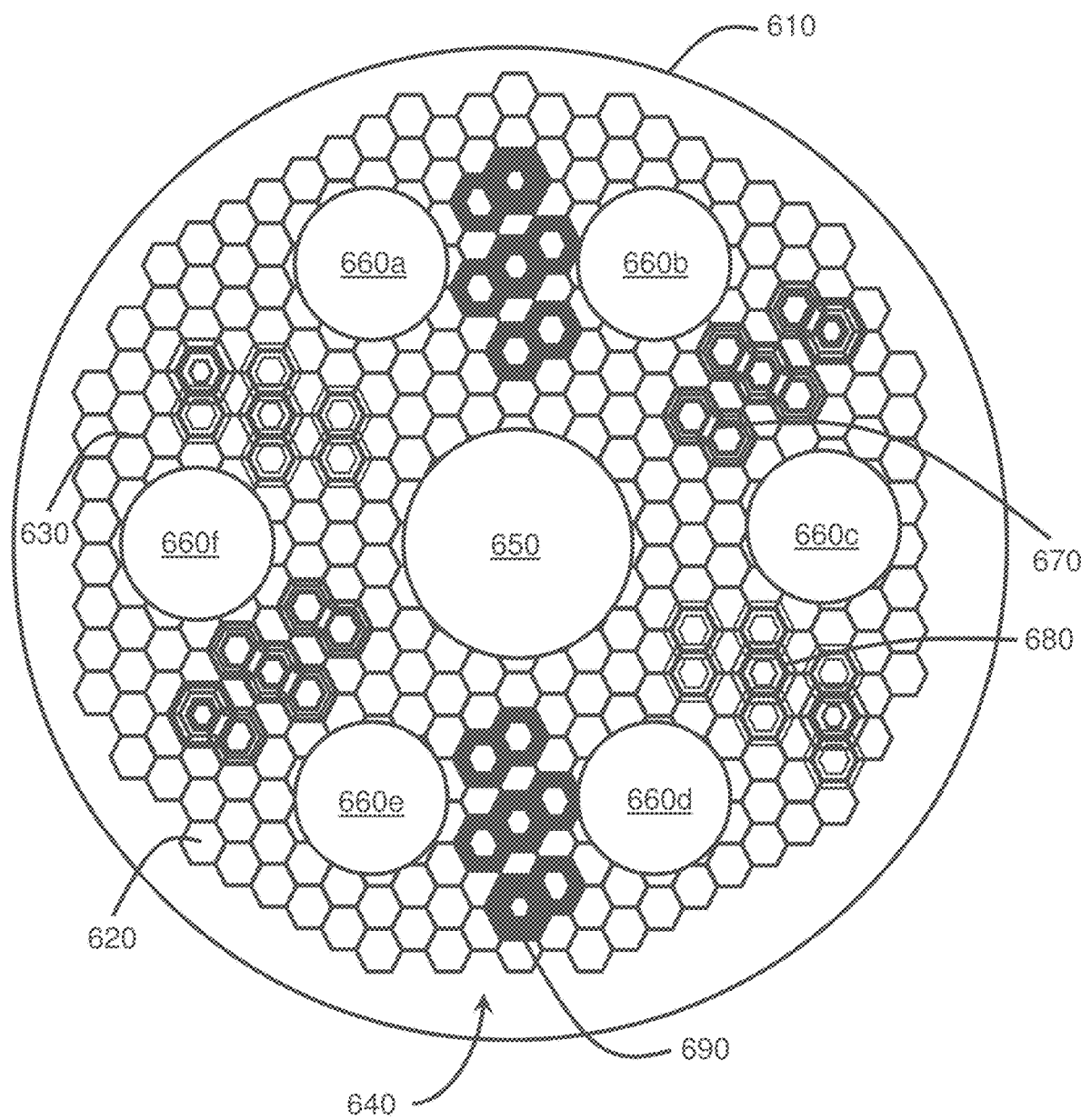
FIG. 6 is a diagram showing a cross section of one embodiment of an HCF having off-line modified holes that vary both radially and azimuthally.

Next, FIG. 6 is a diagram showing a cross section of one embodiment of an HCF having whose modified holes are not restricted to linear paths that extend radially outward from the axial center (for simplicity referred to as "in-line" modified holes) but can also have "off-line" modified holes that are adjacent to said in-line modified holes. Both in-line and off-line modified holes can vary both radially and azimuthally. Again, because cladding holes 620, struts 630, a cladding matrix 640, a hollow core 650, and shunt cores 660a, 660b, 660c, 660d, 660e, 660f (collectively 660) are discussed above with reference to FIG. 2, further discussion of these structural features is omitted with reference to FIG. 6. With this in mind, the modified holes 670, 680, 690 of FIG. 6 are disposed in the cladding matrix 640 at various radial distances from the axial center and, also, at various azimuthal angles from the reference direction, similar to the linear paths shown in FIG. 2. However, different from FIG. 2 (which only shows modified holes that are in-line), the modified holes 670, 680, 690 are located both in-line and off-line. Although the off-line modified holes are shown in FIG. 6 as being adjacent to the in-line modified holes, it should be appreciated that the off-line modified holes are not limited to immediate neighbors of the in-line modified holes but, rather, may extend over a wider geometric range.

Similar to the in-line modified holes (as described with reference to FIG. 2), the off-line modified holes in FIG. 6 can include radially-varying properties, azimuthally-varying properties, or a combination of both radially-varying and azimuthally-varying properties. Furthermore, depending on the embodiment, the in-line properties can be the same as the off-line properties or different from the off-line properties. For example, the average air filling fraction (AFF) of off-line modified holes can be higher than the average AFF of the cladding holes, while the glass area of the in-line modified holes can be lower than the average AFF of the cladding holes. As one can appreciate, the modified cladding holes 670, 680, 690 can include different combinations and permutations of hole diameters, shapes (more round or less round, with more or less convex or concave surfaces, with or without nested shapes inside), wall thicknesses, strut thicknesses, node areas, hole shapes, materials, dopant types, dopant concentrations, surface roughness, losses, optical properties, etc.

As shown in the embodiments of FIGS. 2 through 6, to suppress surface modes, HCF can be modified to have radially-varying shapes, wall thicknesses, hole diameters, surface roughness, optical loss properties, etc. Similarly, the modifications can be azimuthally-varying shapes, wall thicknesses, hole diameters, surface roughness, optical loss properties, etc. Likewise, the modifications can be a combination of both radially-varying properties and azimuthally-varying properties.

Next, it should be appreciated that radially-varying or azimuthally-varying modified holes can be applied to any microstructured or hollow core fiber (HCF), regardless of specific design parameters such as, for example, air filling fraction (AFF), core diameter, number of shunt cores, cladding pitch, number of cladding layers, etc. However, for illustrative purposes, the disclosed HCF (as drawn, as opposed to the assembly stage) comprises six (6) shunt cores, a cladding pitch between approximately 0.5 micrometers (~0.5 μm) and ~50 μm, an AFF of between approximately twenty percent (~20%) and ~99.9%, and a core wall thickness of between ~10% and ~1000% of the average thickness of the struts in the cladding matrix. Certain individual cladding holes that are more central and nearer to the hollow core can have strut thicknesses of between ~5% and ~5000% of the average strut thickness of the other cladding holes in order to achieve specific optical properties at specific optical wavelengths (λ). The modified holes can also have strut thicknesses that vary from between ~5% and ~5000% of the average strut thickness of the other cladding holes in the cladding matrix.

In fabricating the disclosed HCF 210, 310, 410, 510, 610, it should be appreciated that the cross-sectional glass area is modified by selecting different inner diameters or different outer diameters for the modified tubes. It should also be appreciated that, in addition to modifying the cross-sectional glass area, the node area can be modified by adding solid rods between capillaries or changing the size of the holes by applying different pressures to the capillaries during fiber draw (although application of pressures is less preferred and limited to only simple structures due to the complexities associated with applying different controlled pressures concurrently). For other embodiments, it should be appreciated that the length of a strut in the microstructure of a drawn fiber can be increased either by reducing the size of the holes at the endpoints of this strut (thereby effectively stretching the strut from its endpoints) or, in the alternative, by increasing the size of the adjacent holes that are separated by this strut (thereby effectively creating a smaller interstitial space between the larger capillaries and thus stretching the strut from its center). For some embodiments, the outer diameter of the modified tubes at the assembly stage (before draw) is preferably between ~10% to ~1000% (and more preferably between ~80% and ~120%) of the average outer diameter of the other cladding tubes in the cladding matrix of the assembly. For some other embodiments, the air filling fraction (AFF) of the modified tubes is preferably between ~10% and 1000% (and more preferably, between 20% and 200%, and, even more preferably, between ~30% and ~70%) of the average AFF of the capillary tubes for the unmodified cladding holes. Another approach is to use modified tubes with different optical loss properties, different absorption properties, different scattering properties, or different surface roughness. By judiciously selecting the proper dimensions, the proper shapes (more round or less round, with more or less convex or concave surfaces, with or without nested shapes inside), the proper materials, dopant types, dopant concentrations, or a combination thereof, unwanted surface modes can be better suppressed while concurrently maintaining the integrity of preferred modes (such as one of the fundamental modes).

Having taught and enabled several embodiments of HCF with modified microstructures, examples of how such structures affect the signal are provided in two (2) specific HCF (designated as HCF1 and HCF2 for convenience), which are illustrated in FIGS. 8, 9, 11, and 12. For comparison, a reference HCF without modified microstructure (designated as HCF0 for convenience) is illustrated in FIGS. 7 and 10.

Figure 7A:
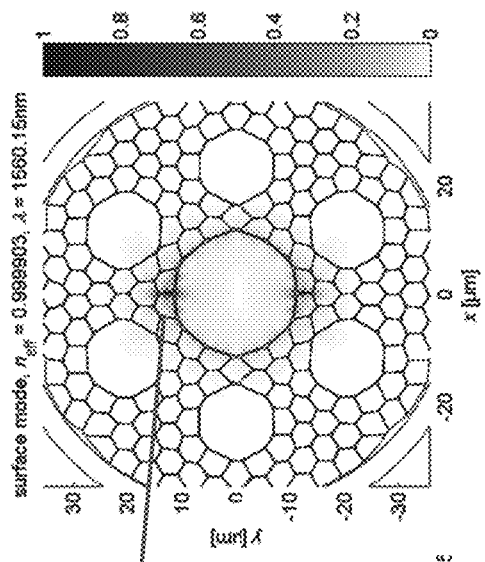
FIG. 7(*a*) is a mode shape map showing a horizontally-polarized fundamental core mode in one example of an HCF with unmodified holes in the cladding (designated as HCF0 for convenience).
Figure 7B:
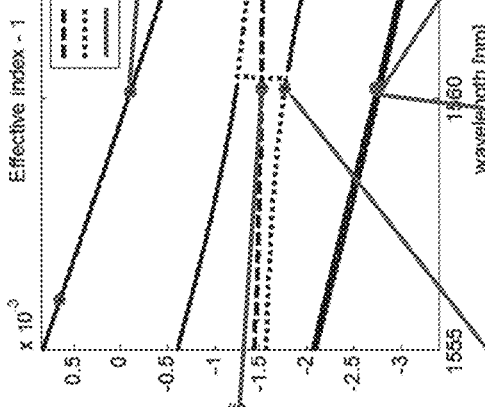
Figure 7C:
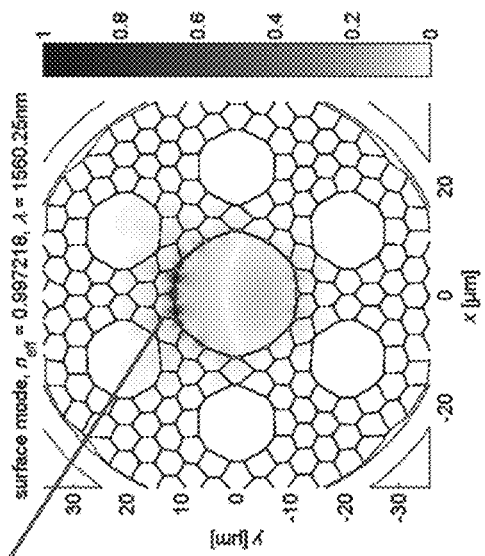
Figure 7D:
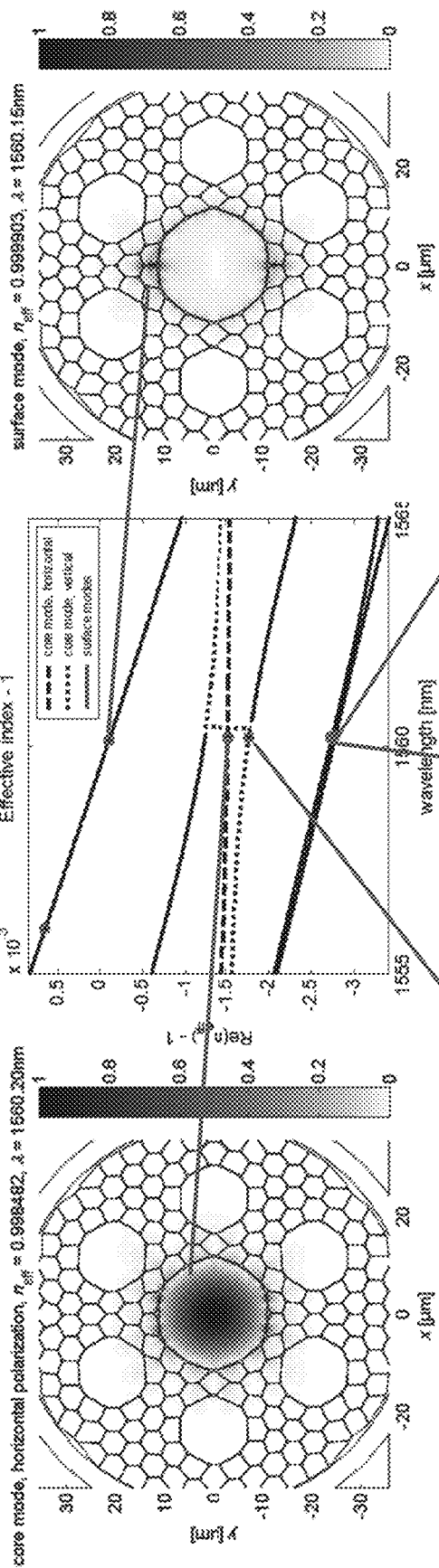
Figure 7E:
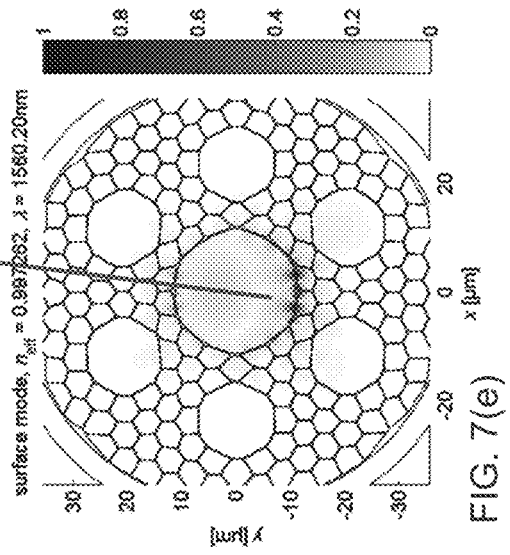
Figure 7F:
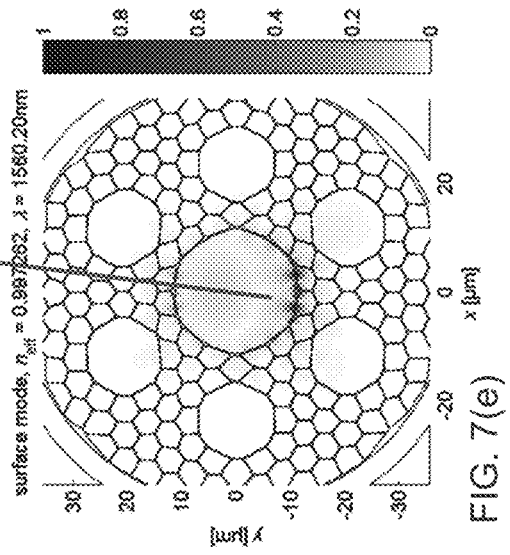

FIG. 7(a) is a mode shape map showing a horizontally-polarized fundamental core mode in one example of an HCF with unmodified holes in the cladding (designated as HCF0 for convenience); FIG. 7(b) is a graph showing an effective index as a function of wavelength for various mode shapes in HCF0; FIG. 7(c) is another mode shape map showing an unwanted surface mode in HCF0; FIG. 7(d) is a mode shape map showing a vertically-polarized fundamental core mode in HCF0; FIG. 7(e) is a mode shape map showing another unwanted surface mode in HCF0; FIG. 7(f) is a mode shape map showing another unwanted surface mode in HCF0. At bottom, FIGS. 7(a) through 7(f) (collectively, FIG. 7) shows an effective index, along with various mode shapes, for HCF0, which is an HCF that has not been modified.

Each mode shape map in FIGS. 7 to 12 shows the normalized Euclidean norm (root of the sum of the squared moduli of the vector components) of the electric field of a particular mode, normalized to a maximum value equal to 1.

Figure 8A:
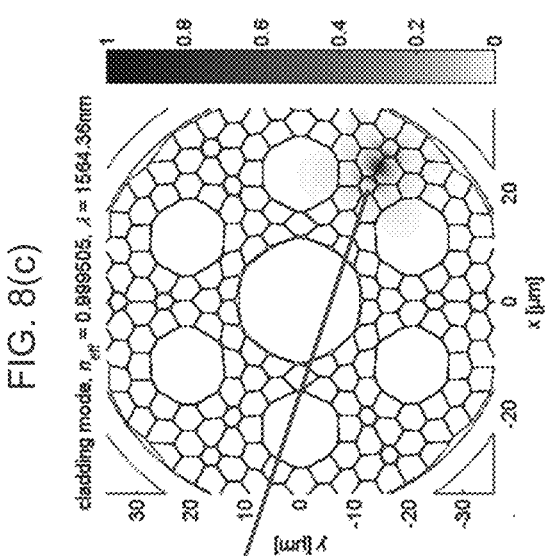
FIG. 8(*a*) is a mode shape map showing an unwanted surface mode in one example of an HCF with modified holes in the microstructured cladding (designated as HCF1 for convenience).
Figure 8B:
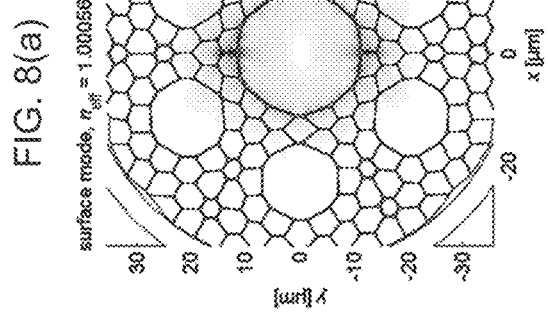
Figure 8C:
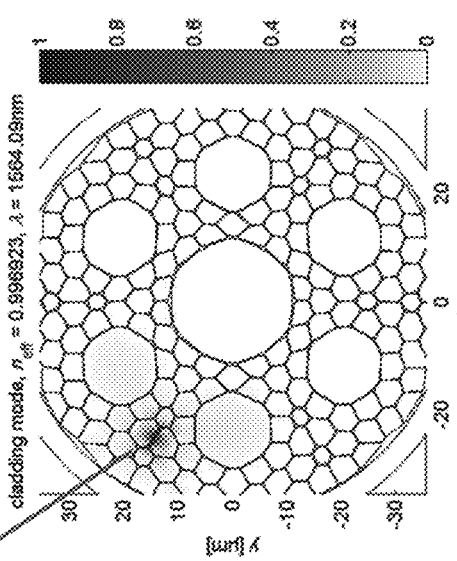
Figures 8D, 8E:
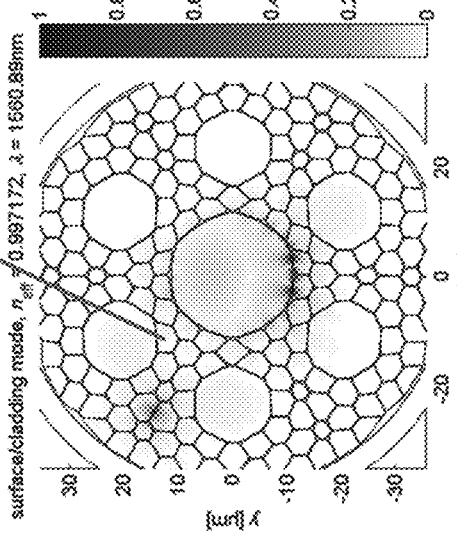
Figure 8F:
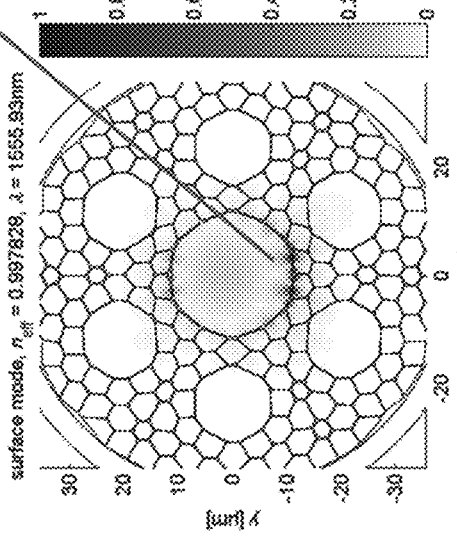

FIG. 8(a) is a mode shape map showing an unwanted surface mode in one example of an HCF with modified holes in the microstructured cladding (designated as HCF1 for convenience); FIG. 8(b) is a graph showing an effective index as a function of wavelength for various mode shapes in HCF1. The points 810, 820 and 830 mark the intersections (more precisely the avoided crossings) of unwanted surface modes and cladding modes; FIG. 8(c) is a mode shape map showing a cladding mode between several modified holes in HCF1; FIG. 8(d) is a mode shape map showing another unwanted surface mode in HCF1; FIG. 8(e) is a mode shape map showing an unwanted surface mode that is coupled to a cladding mode in HCF1; FIG. 8(f) is a mode shape map showing another cladding mode between several modified holes in HCF1. At bottom, FIGS. 8(a) through 8(f) (collectively, FIG. 8) shows an effective index, along with various mode shapes, for HCF1, which is an HCF that has been modified in accordance with the embodiment of FIG. 3. Specifically, the preform capillaries for the modified holes 370, 380 in HCF1 had air filling fraction (AFF) between ~30% and ~70% of the average AFF of the capillaries for the other cladding holes 320.

It should be appreciated that, although a preferred range of between ~30% and ~70% is shown, a larger range of between ~10% and ~200% can be applied and, in even more general cases, a range of between ~1% and ~1000% can also be applied.

Next, FIG. 9(a) is a mode shape map showing a cladding mode in an individual modified hole in another example of an HCF with modified holes in the microstructured cladding (designated herein as HCF2 for convenience); FIG. 9(b) is a graph showing an effective index as a function of wavelength for various mode shapes in HCF2; FIG. 9(c) is another mode shape map showing an unwanted surface mode in HCF2; FIG. 9(d) is a mode shape map showing a cladding mode in another modified hole in HCF2; FIG. 9(e) is a mode shape map showing an unwanted surface mode that is coupled to a cladding mode in HCF2; FIG. 9(f) is a mode shape map showing another unwanted surface mode in HCF2. At bottom, FIGS. 9(a) through 9(f) (collectively, FIG. 9) shows an effective index, along with various mode shapes, for HCF2, which is an HCF that has been modified in accordance with the embodiment of FIG. 4. Similar to HCF1, the preform capillaries for the modified holes 470, 480 in HCF2 have AFF between ~30% and ~70% of the average AFF of the capillaries for the other cladding holes 420.

Some of the modes that we refer to as "surface modes" can have significant fractions of their total optical power in the microstructured cladding, see, e.g., FIG. 9(f). Similarly, some of the "core modes" can have a significant fraction of their total optical power in the microstructured cladding close to the core, and this fraction can depend on the wavelength. For instance, the vertically polarized fundamental "core mode" in FIG. 7(d) has a significant fraction of its total optical power in the microstructured cladding for wavelengths below 1560.4 nm. However, as indicated in FIG. 7(b) by a transition from a dotted to a solid line at 1560.4 nm, this particular mode has most of its optical power in the microstructured cladding close to the core for wavelengths above 1560.4 nm, where it is therefore considered a surface mode. In this range of longer wavelengths, a different mode becomes the vertically polarized fundamental mode (dotted line in FIG. 7(b)). The vertical dotted line in FIG. 7(b) is not indicating a discontinuity of the effective index of a mode, but serves as a visual marker indicating the wavelength 1560.4 nm where these two modes exchange their role of representing the vertically polarized fundamental mode, and the same principle applies to FIG. 8(b) and FIG. 9(b). For convenience, we may refer to such modes as "polarization maintaining (PM) surface modes", as they create generate birefringence and polarization-dependent loss (PDL) and therefore can be useful for certain applications.

Next, FIG. 10(a) is a mode shape map showing an unwanted surface mode in HCF0; FIG. 10(b) is a graph showing total loss as a function of wavelength for various mode shapes in HCF0; FIG. 10(c) is another mode shape map showing another unwanted surface mode in HCF2; FIG. 10(d) is a mode shape map showing a horizontally-polarized fundamental mode in HCF0; FIG. 10(e) is yet another mode shape map showing a vertically-polarized fundamental mode in HCF0; FIG. 10(f) is another mode shape map showing another unwanted surface mode in HCF0. In other words, FIGS. 10(a) through 10(f) (collectively, FIG. 10) shows the loss spectrum and selected mode shapes for HCF0, which does not have modified holes.

Figure 11C:
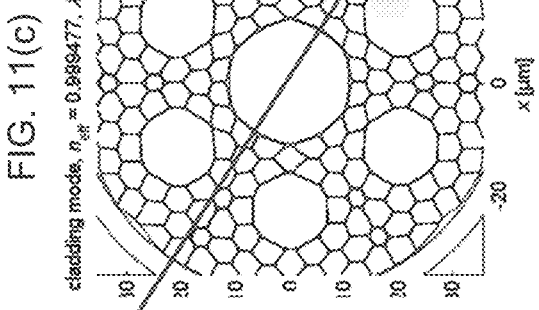
FIG. 11(c) is a mode shape map showing a cladding mode between several modified holes in HCF1.
Figure 11B:
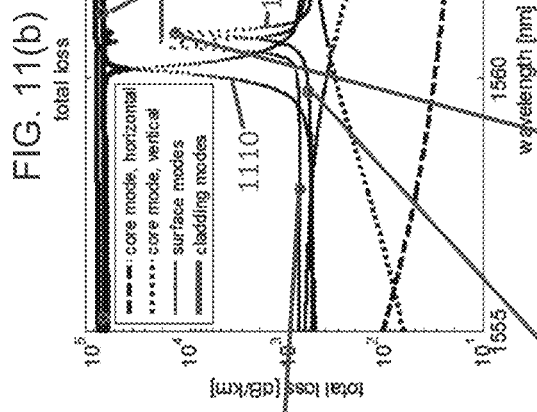
FIG. 11(b) is a graph showing total loss as a function of wavelength for various mode shapes in HCF1.
Figure 11A:
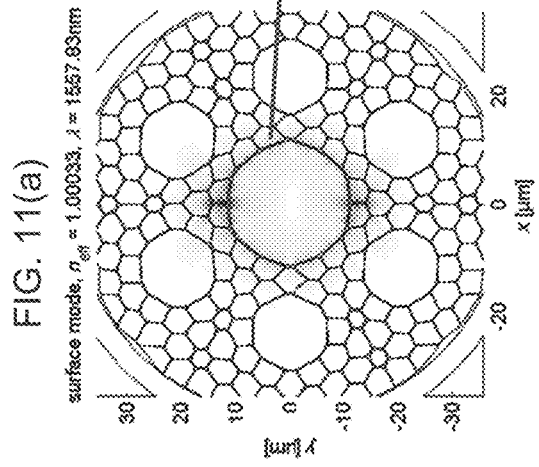
FIG. 11(a) is a mode shape map showing an unwanted surface mode in HCF1.
Figure 11F:
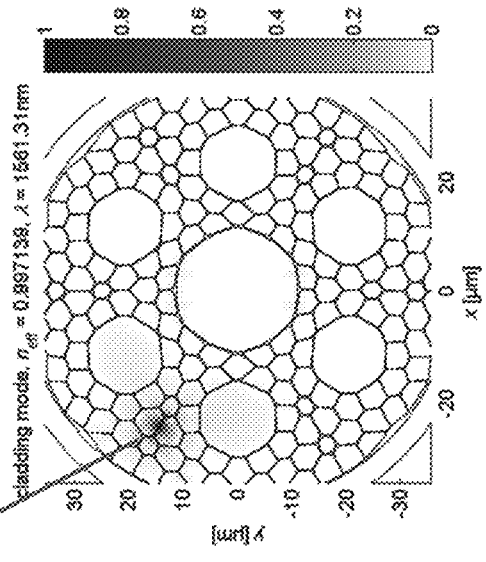
FIG. 11(f) is a mode shape map showing another cladding mode between several modified holes in HCF1.
Figure 11E:
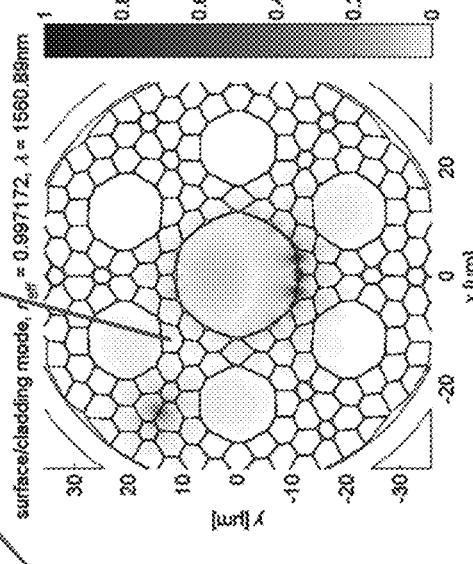
FIG. 11(e) is a mode shape map showing an unwanted surface mode that is coupled to a cladding mode in HCF1.
Figure 11D:
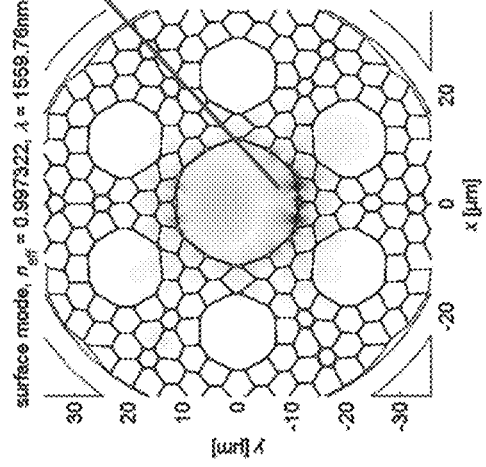
FIG. 11(d) is a mode shape map showing another unwanted surface mode in HCF1.

Next, FIG. 11(a) is a mode shape map showing an unwanted surface mode in HCF1; FIG. 11(b) is a graph showing total loss as a function of wavelength for various mode shapes in HCF1. The surface mode loss spikes 1110, 1120 and 1130 are caused by coupling to highly lossy cladding modes, see the points 810, 820 and 830 in FIG. 8(b). FIG. 11(c) is a mode shape map showing a cladding mode between several modified holes in HCF1; FIG. 11(d) is a mode shape map showing another unwanted surface mode in HCF1; FIG. 11(e) is a mode shape map showing an unwanted surface mode that is coupled to a cladding mode in HCF1; FIG. 11(f) is a mode shape map showing another cladding mode between several modified holes in HCF1. In other words, FIGS. 11(a) through 11(f) (collectively, FIG. 11) shows a total loss, along with various mode shapes, for HCF1.

Next, FIG. 12(a) is a mode shape map showing a cladding mode in an individual modified hole in HCF2; FIG. 12(b) is a graph showing total loss as a function of wavelength for various mode shapes in HCF2; FIG. 12(c) is another mode shape map showing an unwanted surface mode in HCF2; FIG. 12(d) is a mode shape map showing a cladding mode in another modified hole in HCF2; FIG. 12(e) is a mode shape map showing an unwanted surface mode that is coupled to a cladding mode in HCF2; FIG. 12(f) is a mode shape map showing another unwanted surface mode in HCF2. In other words, FIGS. 12(a) through 12(f) (collectively, FIG. 12) shows a total loss, along with various mode shapes, for HCF2.

Total loss is here defined as the sum of the confinement loss (also referred to as tunneling loss), which is proportional to the imaginary part of the effective index, and the scattering loss, which depends on the surface roughness and electric field at the glass-air interfaces inside the holes, including the core. The simulations shown in FIGS. 7 to 12 are examples that illustrate the effect of modified cladding holes and are not meant to precisely quantify the loss or effective index of drawn fibers. Instead, the lowest measured fundamental mode loss of drawn fibers of this type can be significantly lower or higher. By way of example, the range of fundamental mode losses in different embodiments can be tailored to between 0.01 decibels-per-kilometer (dB/km) and 1,000 dB/km at the design wavelength or between 0.1 dB/km and 100 dB/km at the design wavelength; etc. Typically, the lowest measured fundamental mode loss of drawn fibers of this type is between 1 dB/km and 10 dB/km. Furthermore, FIGS. 7 to 12 show only the microstructured part of the fiber, but not the surrounding solid cladding.

As shown in FIGS. 8 and 9, when the modifications are selected appropriately, the additional cladding modes can be brought closely in effective index to the unwanted surface modes, such that both types of modes couple efficiently during propagation. Effectively, the lossy cladding modes increase the suppression of the unwanted surface modes as compared to HCF without modified holes (which is illustrated in FIGS. 7 and 10). The improved suppression of unwanted surface modes is due largely to an increase in tunneling loss (which is proportional to the imaginary part of the effective index), even though a minor increase in scattering loss can also be observed because of a slight increase in electric field amplitude along the perimeter of the hollow core (shown by comparing FIG. 9 with FIG. 10).

By changing the modified properties (e.g., AFF, outer diameter, inner diameter, shape, surface roughness, material, dopant type, dopant concentration, etc., or any combination thereof), the effective index ($n_{eff}$) of additional cladding modes (see FIGS. 8 and 9) are changed with reference to both wavelength position and slope, $dn_{eff}/d\lambda$ (which is a derivative of the effective index with respect to the wavelength ($\lambda$)). For a mode with effective index $n_{eff}(\lambda)$, at $\lambda$, the group index of the mode is:

$$n_{group} = n_{eff} - \lambda(dn_{eff}/d\lambda) \qquad [\text{Eq. 1}].$$

Re-writing Eq. 1:

$$dn_{eff}/d\lambda = (n_{eff} - n_{group})/\lambda \qquad [\text{Eq. 2}].$$

Thus, by way of example, the slope of the effective index of the additional cladding modes can be generally between ~20% and ~80% of the slope of the unwanted surface modes or, more generally, between ~5% and ~300% of the slope of the unwanted surface modes.

For the straight fiber, we chose the twelve o'clock position (extending from the axial center) as the reference direction to quantify the azimuthal angle. For the following mathematical description of a bent fiber, we use the reference direction that points from the axial center in the direction away from the center of the bend. In other words, at an azimuthal angle $\theta = 0°$, an increased distance r from the fiber axis corresponds to an increased distance from the center of the bend. Vice versa, the center of the bend is located at an azimuthal angle $\theta = 180°$ and at a distance R (which is the bend radius) from the fiber axis. As is well known to people skilled in the art, a bend of radius R effectively tilts the refractive index profile $n(r, \theta)$ of an optical fiber according to:

$$n_{bent}(r,\theta) = n(r,\theta) \cdot [1 + \cos(\theta) r/R] \qquad [\text{Eq. 3}].$$

Hence, the effective index of a mode with effective index $n_{eff}$ that resides in the cladding at an approximate distance $\cos(\theta) r$ from the neutral plane of the bend changes approximately by:

$$\Delta n_{eff} = n_{eff} \cdot \cos(\theta) \cdot r/R \qquad [\text{Eq. 4}].$$

To intermittently couple two modes whose effective indices in the straight fiber are separated by a small amount $\Delta n_{eff}$, i.e., $|\Delta n_{eff}| \ll n_{eff}$, Eq. 4 implies a sufficient bending radius $$R = \cos(\theta) \cdot r \cdot n_{eff}/\Delta n_{eff} \qquad [\text{Eq. 5}].$$

As an example, if a cladding mode resides at an approximate distance $\cos(\theta) \cdot r \sim 30$ μm from the neutral plane of the bend, and if its effective index $n_{eff} \sim 1$ differs from the effective index of a surface mode by $\Delta n_{eff} = 0.0003$, already a very mild bending radius R=30 μm/0.0003=10 cm is sufficiently tight according to Eq. 5 to phase-match the cladding mode to the surface mode and thus to transfer power from the unwanted surface mode to the highly lossy cladding mode. Equivalently, if the quotient $R/\cos(\theta)$ of bend radius and cosine of the azimuthal angle $\theta$ satisfies $R/\cos(\theta)=10$ cm, the effective index of the cladding mode can differ from the effective index of the unwanted surface mode by as much as $\Delta n_{eff}=0.0003$ (in the straight fiber) while still achieving mode coupling in the bent fiber. If the effective index slope $|dn_{eff}/d\lambda|$ of the surface mode is, e.g., $5.4 \cdot 10^{-5}$/nm larger (i.e., steeper) than the effective index slope of an intersecting cladding mode as in the example at point 810 in FIG. 8(b), this change of $\Delta n_{eff}=0.0003$ corresponds to an approximate shift $\Delta\lambda \sim 0.0003/(5.4 \cdot 10^{-5}/\text{nm})=5.5$ nm of the coupling points 810 in FIG. 8(b) and the loss spike 1110 in FIG. 11(b). If the bend-induced effective index change of the surface mode is not negligible, this spectral shift may be larger or smaller. If this fiber is twisted along a bend of radius R=10 cm, the surface mode loss spike 1110 therefore scans a wavelength range of width $2 \cdot 5.5$ nm=11 nm over each full twist (azimuthal rotation of 360°), effectively attenuating the surface mode over this entire wavelength range. With a smaller value $R/\cos(6)=1$ cm, a similar calculation results in a wavelength shift $\Delta\lambda \sim 55$ nm. Similar calculations hold for the loss spikes 1120 and 1130 in FIG. 11(b). Depending on the particular fiber design, the index slopes $|dn_{eff}/d\lambda|$ of the surface modes and cladding modes may be substantially larger (e.g., 10 times larger) or smaller (e.g., 10 times smaller), corresponding to much larger or smaller wavelength shifts $\Delta\lambda$.

Although exemplary embodiments have been shown and described, it will be clear to those of ordinary skill in the art that a number of changes, modifications, or alterations to the disclosure as described may be made. For example, although embodiments for HCF are disclosed, the modifications are equally applicable to photonic bandgap fibers, Kagome fibers, photonic crystal fibers, etc. All such changes, modifications, and alterations should therefore be seen as within the scope of the disclosure.

What is claimed is:

1. An optical fiber having an axial cross section, the axial cross section having an axial center, the axial cross section further having a reference direction that extends radially in one direction from the axial center, the optical fiber comprising:
    a hollow core located substantially at the axial center; and
    a cladding matrix surrounding the hollow core, the cladding matrix comprising:
        cladding holes having cladding-hole properties;
        struts located between cladding holes, the struts having substantially uniform properties; and
        n non-uniform modified holes disposed in the cladding matrix at various radial distances from the axial center, n being an integer multiple of 6, the non-uniform modified holes further being disposed in the cladding matrix at approximately sixty degree (60°) angle increments from the reference direction, wherein the non-uniform modified holes have modified properties that differ from the cladding-hole properties, and wherein at least one modified hole has at least one modified property that differs from that of a second modified hole.

2. The optical fiber of claim 1, n being 6.
3. The optical fiber of claim 1, n being 12.
4. The optical fiber of claim 1, n being 18.
5. The optical fiber of claim 1, further comprising a shunt core located in the cladding matrix.

6. The optical fiber of claim 1, the modified holes being located along linear paths that extend radially outward from the axial center.

7. The optical fiber of claim 1, wherein the non-uniform modified holes vary radially and do not vary azimuthally.

8. The optical fiber of claim 1, wherein the non-uniform modified holes vary azimuthally and do not vary radially.

9. The optical fiber of claim 1, wherein the non-uniform modified holes vary both radially and azimuthally.

10. In a manufacturing process using an outer tube having a substantially circular axial cross section, the axial cross section having an axial center, the axial cross section further having a reference direction that extends radially in one direction from the axial center, a process comprising the steps of:

arranging capillary tubes in the outer tube to form a matrix having a hollow region at the axial center; and positioning n non-uniform modified tubes among the capillary tubes, the non-uniform modified tubes having modified properties, n being an integer multiple of 6, the non-uniform modified tubes being positioned at various radial distances from the axial center, the non-uniform modified tubes further being positioned at approximately sixty degree (60°) angle increments from the reference direction, and wherein at least one modified hole has at least one modified property that differs from that of a second modified hole.

11. The process of claim 10, each modified tube having its respective hole diameter, wall thickness, node glass area, surface roughness, material composition, dopant type, and dopant concentration.

12. The process of claim 10, n being 6.

13. The process of claim 10, n being 12.

14. The process of claim 10, n being 18.

15. The process of claim 10, wherein the non-uniform modified holes vary radially and do not vary azimuthally.

16. The process of claim 10, wherein the non-uniform modified holes vary azimuthally and do not vary radially.

17. The process of claim 10, wherein the non-uniform modified holes vary both radially and azimuthally.

* * * * *